(12) United States Patent
He et al.

(10) Patent No.: US 10,437,688 B2
(45) Date of Patent: Oct. 8, 2019

(54) ENHANCING CONSISTENT READ PERFORMANCE FOR IN-MEMORY DATABASES

(71) Applicant: Oracle International Corporation, Mail Stop, CA (US)

(72) Inventors: Xiaoming He, Redwood Shores, CA (US); Vivekanandhan Raja, Fremont, CA (US); Tirthankar Lahiri, Palo Alto, CA (US); Sanket Hase, Mountain View, CA (US)

(73) Assignee: Oracle International Corporation, Redwood Shores, CA (US)

(*) Notice: Subject to any disclaimer, the term of this patent is extended or adjusted under 35 U.S.C. 154(b) by 500 days.

(21) Appl. No.: 15/273,273

(22) Filed: Sep. 22, 2016

(65) Prior Publication Data

US 2018/0081767 A1  Mar. 22, 2018

(51) Int. Cl.
| | | |
|---|---|---|
| G06F 17/30 | (2006.01) | |
| G06F 11/14 | (2006.01) | |
| G06F 3/06 | (2006.01) | |
| G06F 16/23 | (2019.01) | |

(52) U.S. Cl.
CPC .......... *G06F 11/1471* (2013.01); *G06F 3/061* (2013.01); *G06F 3/0638* (2013.01); *G06F 3/0673* (2013.01); *G06F 11/1474* (2013.01); *G06F 16/2365* (2019.01); *G06F 3/0656* (2013.01)

(58) Field of Classification Search
None
See application file for complete search history.

(56) References Cited

U.S. PATENT DOCUMENTS

| | | | |
|---|---|---|---|
| 5,742,792 A | 4/1998 | Yanai et al. | |
| 5,778,430 A | 7/1998 | Ish et al. | |
| 6,009,432 A | 12/1999 | Tarin | |
| 7,149,769 B2 | 12/2006 | Lubbers et al. | |
| 8,032,496 B2 * | 10/2011 | Sinha | G06F 16/219 707/685 |
| 8,037,040 B2 * | 10/2011 | Vemuri | G06F 16/24568 707/702 |

(Continued)

FOREIGN PATENT DOCUMENTS

| | | |
|---|---|---|
| EP | 2 608 070 A1 | 6/2013 |
| WO | WO 2007/078444 A1 | 7/2007 |

OTHER PUBLICATIONS

Schaffner et al., "A Hybrid Row-Column OLTP Database Architecture for Operational Reporting", Business Intelligence for the real-time Enterprise, dated Aug. 24, 2008, 14 pages.

(Continued)

*Primary Examiner* — Debbie M Le
(74) *Attorney, Agent, or Firm* — Elliot H. Karlin; Hickman Palermo Becker Bingham LLP

(57) ABSTRACT

Techniques are described for maintaining coherency of a portion of a database object mirrored in a particular node of a database. The techniques involve maintaining invalidation logs which identify transactions that have committed to a database. Based on the invalidation logs, the particular node generates invalid-row ID metadata which identifies, for each system change number, one or more rows that are not transactionally consistent with data stored in the database object as of said system change number.

14 Claims, 4 Drawing Sheets

(56) References Cited

U.S. PATENT DOCUMENTS

| | | | |
|---|---|---|---|
| 8,433,684 | B2 | 4/2013 | Munoz |
| 8,650,156 | B1 | 2/2014 | McHugh |
| 8,856,484 | B2 | 10/2014 | Ben-Tsion et al. |
| 9,128,972 | B2 * | 9/2015 | Raja .................... G06F 16/2365 |
| 9,189,414 | B1 | 11/2015 | Shim |
| 9,636,468 | B2 * | 5/2017 | Tromborg ............. A61M 5/425 |
| 2005/0055380 | A1 | 3/2005 | Thompson et al. |
| 2008/0059492 | A1 | 3/2008 | Tarain |
| 2008/0256250 | A1 | 10/2008 | Wakefield |
| 2008/0281784 | A1 | 11/2008 | Zane et al. |
| 2008/0281865 | A1 | 11/2008 | Price et al. |
| 2010/0235335 | A1 | 9/2010 | Heman et al. |
| 2010/0250549 | A1 | 9/2010 | Muller et al. |
| 2011/0029569 | A1 | 2/2011 | Ganesh et al. |
| 2011/0107025 | A1 | 5/2011 | Urkude |
| 2011/0138123 | A1 | 6/2011 | Aditya et al. |
| 2012/0054225 | A1 | 3/2012 | Marwah |
| 2012/0173515 | A1 | 7/2012 | Jeong et al. |
| 2012/0323971 | A1 | 12/2012 | Pasupuleti |
| 2013/0064052 | A1 | 3/2013 | Mehra |
| 2014/0040218 | A1 | 2/2014 | Kimuira et al. |
| 2014/0075493 | A1 | 3/2014 | Krishnan et al. |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2015/0134900 | A1 | 5/2015 | Lin |
| 2016/0034214 | A1 * | 2/2016 | Kamp ................. G06F 11/2058 711/114 |
| 2017/0116252 | A1 * | 4/2017 | Krishnaswamy ... G06F 16/2379 |

OTHER PUBLICATIONS

Ramamurthy, Ravishankar, "A Case for Fractured Mirrors", Proceedings of the 28th VLDB Conference, dated 2002, 12 pages.

Nirmesh, Malviya, "Recovery Algorithms for In-Memory OLTP Databases", Master of Science Thesis, dated Jul. 1, 2012, 66 pages.

Farber et al., "SAP HANA Database—Data Management for Modern Business Applications", SIGMOD Record, dated Dec. 2011, vol. 40, No. 4, 8 pages.

* cited by examiner

ENHANCING CONSISTENT READ PERFORMANCE FOR IN-MEMORY DATABASES

FIELD OF THE INVENTION

The present invention relates to data storage and retrieval techniques in a database, and more specifically to improved computer-implemented techniques for determining which in-memory items are usable by a past-state consistent-read query.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Consistent Read is characterized by two rules. First, every statement executed by a transaction sees only (1) changes that were committed to the database by a particular set of committed transactions (the "snapshot set") and (2) changes made by the transaction itself. Consistent Read requires that queries see "snapshots" of the database. Changes made by excluded transactions may be committed to the database before a query of a serializable transaction has completed. When such changes occur, the database no longer reflects the data as it existed in the snapshot. Consequently, database servers typically provide a mechanism for determining how the database appeared in the snapshot. One such mechanism is described in U.S. Pat. No. 5,870,758, entitled "Method and Apparatus for Providing Isolation Levels in a Database System", the entire contents of which is incorporated herein.

To implement Consistent Read, database servers typically assign a snapshot number to a transaction when the transaction commits to indicate to other transactions the transaction set(s) to which the transaction belongs. To establish a snapshot set for a query, a logical time stamp (SCN) is assigned to the query, and the database server only permits the query to see changes made by transactions that were assigned snapshot numbers that are lower than the SCN assigned to the query. Consistent Read becomes more complicated in systems that store multiple sets of the same data, where updates cause one set of the data to be updated and the other set of the data to be invalidated.

Specifically, database systems typically store database objects (e.g. tables, indexes, etc.) on disk, and load data items from those database objects into volatile memory on an as-needed basis. Once loaded into volatile memory, the data items may remain cached in volatile memory so that subsequent accesses to the same data items will not incur the overhead of accessing a disk. Those data items may be replaced in cache, for example, to make room in volatile memory to store other data items that have been requested.

Rather than load individual data items on a per-item basis, entire database objects, or portions thereof, may be preloaded into volatile memory. Various approaches for loading entire database objects, or selected portions thereof, into volatile memory to speed up database operation processing are described in U.S. patent application Ser. No. 14/337,179, entitled "Mirroring, In Memory, Data From Disk To Improve Database operation Performance", filed Jul. 21, 2014, referred to herein as the "Mirroring" application, the contents of which is incorporated herein in its entirety.

According to the approaches described in the Mirroring application, database objects, or portions thereof, are stored in volatile memory in a different format than the format that those same objects have on disk. For example, the in-memory copies of the objects may be stored in a column-major format, while the on-disk copies are stored in a row-major format. An in-memory version or copy of an object (or selected portions thereof), is referred to herein as an In-Memory-Columnar Unit (IMCU).

On-disk data is stored in "blocks". For disk blocks that store data for a table of a database, a single block may contain items from a plurality of rows of the table. When a particular node wishes to make a change to one or more items that are stored in a particular block, the particular node obtains a write lock that covers the particular block, loads a copy of the block into a buffer cache in volatile memory, and makes the change to the cached copy of the block. When the transaction that made the change commits, the changes made by the transaction become permanent.

When a node commits a transaction to the database which changes one or more items, the copies of those data items that reside in the node's IMCU becomes stale. For example, assume that block A has items X, Y and Z, and that a particular node executes a transaction that updates item X. Assume further that copies of items X, Y and Z are in an IMCU in the particular node. After the update to item X made in the particular node, the copy of item X in the IMCU in the particular node is stale because the particular node does not update data in the IMCU directly. To prevent the use of stale data, the particular node stores invalidity data which identifies, as of the last transactional state of the database, which items in the mirrored data are not transactionally consistent with corresponding items in the database. The last transactional state of the database may include a current transactional state of the database.

When the node receives a query for data mirrored in the IMCU, the node can check the current invalidity data to determine which rows in the IMCU are invalid, i.e. not transactionally consistent with corresponding rows in the database. Thus, in response to the query, the node can return items Y and Z from the IMCU and obtain versions of item X from other sources, such as an in-memory journal, buffer cache, or disk. While the invalidity data on its own generally allows for efficient use of data mirrored in the IMCU, the invalidity data is restricted to the last transactional state of the database.

As mentioned above, to implement consistent read, each query is assigned an SCN. The SCN assigned to a query identifies a transactional state of the database at a particular time. If transactions that made changes to items in the IMCU commit after a query is assigned an SCN but before the query accesses the IMCU, then (a) the invalidity data will indicate that some items that can be used by the query are invalid, and (b) the SCN of the query will be less than the SCN associated with the invalidity data. As an example, if changes were made to item X at a first SCN and changes were made to item Y at a second SCN, the invalidity data would identify both item X and item Y as invalid. If a query is processed with a query SCN between the first SCN and the second SCN, then the invalidity data would still identify both item X and item Y as invalid, even though only item X was invalid as of the query SCN. Queries that have been assigned SCNs that are older than the SCN of the invalidity data of an IMCU are referred to herein as past-state consistent-read queries.

One way to better take advantage of IMCUs when processing past-state consistent-read queries is to construct a past-state delete vector, as described in U.S. Pat. No. 9,128,972, entitled "Multi-Version Concurrency Control On In-Memory Snapshot Store Of Oracle In-Memory Database", the contents of which are incorporated herein. A past-state delete vector includes one bit per row of an IMCU, where the bit for a row has a value that indicates whether the data in the IMCU for that row was valid as of the snapshot time associated with the delete vector. Unfortunately constructing a past-state delete vector every time a past-state consistent-read query is processed may incur an unacceptable amount of overhead.

One way to reduce the overhead of processing a past-state consistent-read query using data from an IMCU involves the use of temporal clones, as described in U.S. patent application Ser. No. 14/506,613, entitled "Temporal Clones To Identify Valid Items From A Set Of Items", filed Oct. 4, 2014, the contents of which are incorporated herein by reference. A temporal clone is a cached copy of a bitmap vector. Similar to past-state delete vectors, a temporal clone includes one bit per row, and indicates which rows in an IMCU are valid as of a "clone time" associated with the temporal clone.

Unfortunately, even when using temporal clones to determine which data items within an IMCU can be used by a past-state consistent-read query, the conversion of the past-state delete vectors into the row identifiers of the actual rows that are invalid can incur a significant amount of overhead. Further, the larger the bitmap, the greater the overhead.

DETAILED DESCRIPTION

Figure 1:
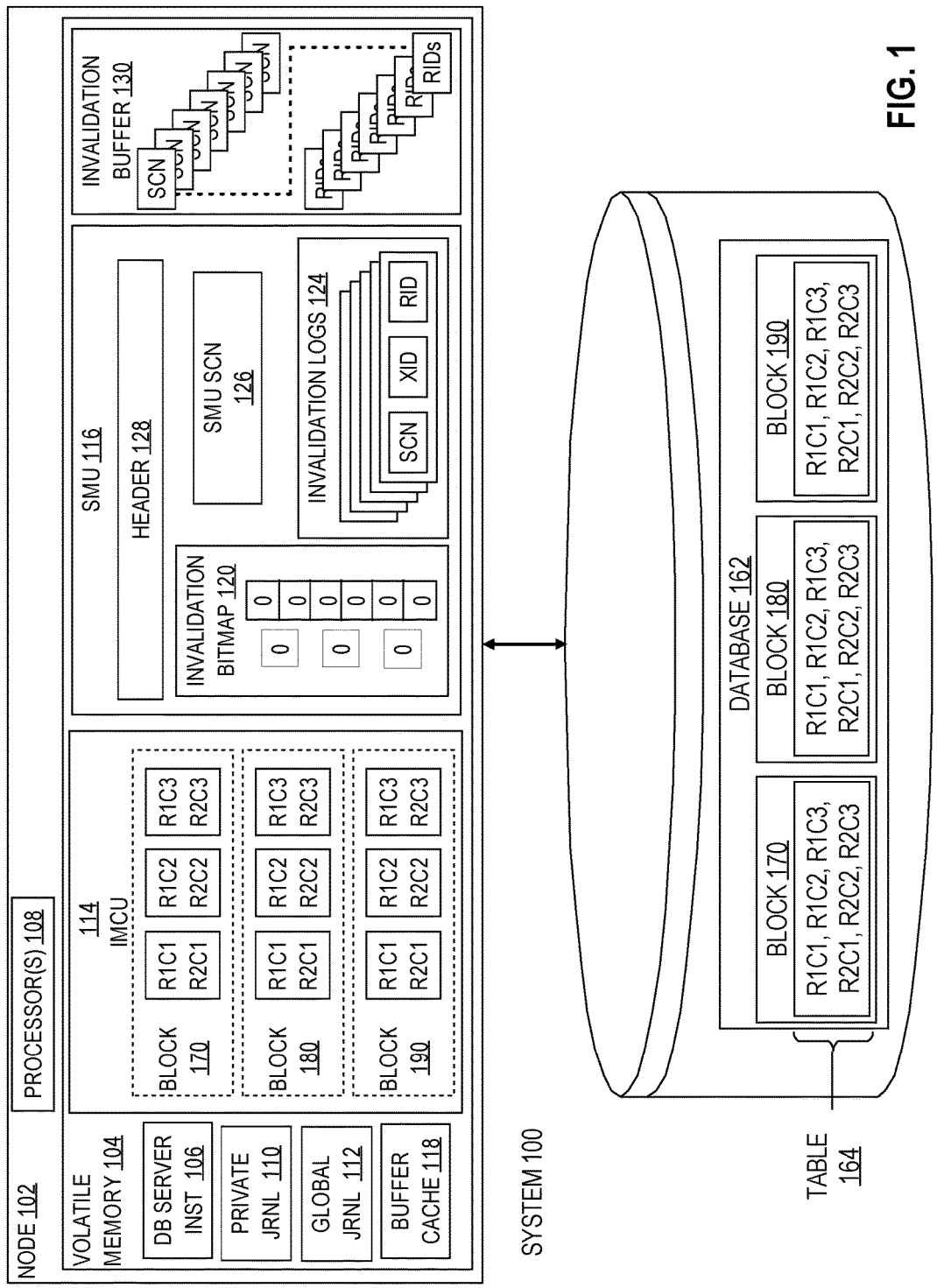
FIG. 1 is a block diagram illustrating a database cluster with a current version of a database object in the volatile memory of a particular node.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for reducing or eliminating the overhead associated with converting temporal clones to row identifiers in order to identify which items in an IMCU are invalid. According to one embodiment, a node stores, in an invalidation buffer, a set of row identifiers for each row that is invalid as of a particular SCN. When the node receives a past-state consistent-read query, the node uses the row identifiers stored in the invalidation buffer to identify rows which were invalid as of a query SCN. By caching the row identifiers themselves, rather than just a temporal clone of a delete vector, the node is able to bypass the significant amount of overhead incurred in converting past-state delete vectors into row identifiers.

Database Systems

A database management system may comprise one or more database servers. A database comprises database data and metadata that is stored on a persistent memory mechanism, such as a set of hard disks. Metadata defines database objects, such as relational tables, table columns, views, and triggers.

Database applications and clients interact with a database server by submitting to the database server commands that cause the database server to perform operations on data stored in a database. A database command may be in the form of a database statement that conforms to a database language.

One of the languages for expressing database requests is the Structured Query Language (SQL). There are many different versions of SQL; some versions are standard, others are proprietary. There is also a variety of extensions to SQL. SQL data definition language (DDL) instructions may be issued to a database server to create or configure database objects, such as tables, views, or complex data types. SQL/XML is a common extension of SQL used when manipulating XML data in an object-relational database.

Generally, data is logically arranged within a database in one or more data containers. Each container contains records, and the data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the presented approach are not limited to any particular type of data container or type of database architecture. However, for the purpose of explanation, the examples and the terminology used herein are usually associated with relational or object-relational databases. Thus, the terms "table, " "row," and "column" are used herein to refer respectively to the data container, record, and field.

Data containers are typically stored on a hard disk in one or more data blocks. Hence, while instructions or queries issued to a database server refer to data as tables, rows, and columns, that data is actually stored in a database as a collection of data blocks. Through the use of various stored metadata, indexes, and headers, the database server is able to interpret the data within the data blocks as logical tables, rows, and columns.

A data block is an atomic unit of storage space allocated to store raw data for one or more database records (e.g., rows) or portions thereof. Typically, a database system is configured to read and write database records from persistent cache and volatile memory in units no smaller than data blocks. When a record, from a data block, needs to be retrieved, an entire data block containing the record (or pertinent portion of the record) is read into a buffer that the database system uses to temporarily store data blocks. The data block read into the buffer may contain other records or portions thereof.

System Overview

Referring to FIG. 1, system 100 includes database 162 and node 102. Node 102 has one or more processors 108 and local volatile memory 104. In addition, node 102 is executing database server instance 106. While in the illustrated embodiment node 102 is executing a single database server instance, in alternative embodiments a single node may execute more than one database server instance.

Database server instance 106 executes database commands that are submitted to a database server by one or more database applications (not shown). The data used by those applications is primarily in database 162.

Database 162 contains database objects such as table 164. Table 164 includes three blocks, each containing columns c1-c3, and three rows r1-r3 for a total of eighteen data items. While in FIG. 1, each block contains rows with similar identifiers: R1C1, R1C2, R1C3, R2C1, R2C2, and R3C3, in other embodiments, each row comprises a unique identifier. Although the data items are logically arranged in a table when viewed by a user, in the embodiment illustrated in FIG. 1, data items for table 164 are stored as row-major blocks 170, 180, 190 on disk. Thus, each row can be identified based on a corresponding block.

Block 170 stores data items B170R1C1, B170R1C2, B170R1C3, B170R2C1, B170R2C2, B170R2C3

Block 180 stores data items B180R1C1, B180R1C2, B180R1C3, B180R2C1, B180R2C2, B180R2C3

Block 190 stores data items B190R1C1, B190R1C2, B190R1C3, B190R2C1, B190R2C2, B190R2C3

Node 102 is able to independently access any block 170, 180, 190 of table 164. After accessing a particular block, the block may be cached in a local buffer cache 118. It is much faster for any given database server instance to access data items of table 164 from blocks that are stored in its local volatile memory. If a node updates a block and the modifications to that block are not reflected on disk, that particular buffer cache is referred to as "dirty." If the node has a copy of a block in a local buffer cache and the copy of the bock is the same as the on-disk copy, then the buffer cache is said to be "clean."

For the purpose of illustration, database 162 is shown as stored on a single shared disk, but in alternative embodiments, database 162 may be spread across multiple disks to which 102 has access.

In-Memory Columnar Units (IMCUs)

In an embodiment, mirror format data is organized, within volatile memory 104 in IMCU 114. Mirror format data may include copies of all of the persistent format data, or a subset thereof. Thus, although node 102 is depicted as including copies of each data entry in blocks 170, 180, and 190, in an embodiment node 102 only contains a copy of a subset of the data in database 162. Data stored in IMCU 114 may be specified by a user of node 102 as "in-memory enabled" data from database 162.

In an embodiment, the mirror format data in IMCU 114 is used to satisfy queries. By using mirror format data, node 102 is able to supply data items that are unavailable in buffer cache 118 without needing to access database 162 in persistent storage.

Even in situations where the data required by a database operation is not included in the mirror format data in IMCU 114, the mirror format data may be used to evaluate predicates, and thereby speed up the database operations. For example, assume that table 200 has thousands of rows, and in only three of those rows does column c1 have the value "joe". Under these circumstances, a database server may receive a database command that requests the values, from column c3, of all rows where c1="joe".

In this example, the data that needs to be returned by the database command is from column c3, which is not in the mirror format data. However, the data in IMCU 114 for column 1 may be used to quickly identify the three rows where c1="joe". This operation can be performed efficiently because the data items required to evaluate the predicate (values from c1) are stored contiguously in volatile memory. Once those rows have been identified, the database server may retrieve from disk only those blocks needed to obtain the data from those three rows.

Journals

According to one embodiment, IMCUs are treated as read-only. Treating an IMCU as read-only reduces overhead, particularly in situations where the IMCU is in a compressed format. If not treated as read-only, every time any item within the IMCU is updated, the entire IMCU would have to be decompressed, updated, and recompressed.

According to one embodiment, because the IMCU is treated as read-only and therefore will not itself reflect changes made after the IMCU is created, every database operation affecting data stored in an IMCU is tracked in a private journal (110) maintained for the transaction that is performing the operation. A transaction is a sequence of database operations that are treated as a single unit. Using the private journal, a node may track transaction-specific changes to items that have mirror format (MF) copies in the node's IMCU without actually changing those MF copies in the IMCU.

Any given transaction is able to access its own private journal to see all changes that it itself has made, but no other transactions can see those changes until the transaction commits. For example if node 102 is executing a transaction X associated with private journal 110, private journal 110 is only accessible by transaction X until transaction X commits. Once the transaction X commits, the aggregate changes from private journal 110 are pushed to a corresponding global journal.

Invalidity Data

To ensure that each node is aware of the IMCU data that is no longer valid, each IMCU has a corresponding snapshot metadata unit (SMU) 116 that stores, among other things, invalidity data. According to one embodiment, each SMU includes a plurality of bitmaps that indicate which portions of the IMCU are invalid, where each bitmap of the plurality of bitmaps indicates invalidity at a different level of granularity.

For example, in FIG. 1, SMU 116 for IMCU 114, invalidation bitmap 120 includes bits for block-level invalidity and row-level invalidity. Bits in the block-level invalidity portion of invalidation bitmap 120 indicate which blocks in database 162 have invalid data items within IMCU 114. Bits in the row-level invalidity portion of invalidation bitmap 120 indicate which rows in database 162 have invalid data items within IMCU 114.

Invalidation bitmap 120 is associated with an SMU system change number (SCN) 126. An SCN represents a transactional state of a database at a particular time. For example, when data is first read into IMCU 114, the SCN of SMU 116 may be set to 100. When a first transaction is executed, the SCN may increment to 105. If a transaction changes data in one or more rows of IMCU 114, SMU 116 updates invalidation bitmap 120 and increments SMU SCN 126 to the commit SCN of the transaction. In the state illustrated in FIG. 1, no bits are set in bitmap 120. Consequently, all data within IMCU 114 is valid as of SMU SCN 126. Thus, if node 102 receives a query with a query SCN which matches SMU SCN 126, node 102 may identify all of the data in IMCU 114 as valid.

SMU 116 may also store invalidation logs 124. The invalidation logs 124 identify, for each transaction, at least:
- an SCN that indicates the commit time of the transaction, and
- the row ID of each of the rows affected by the transaction.

In an embodiment, the row ID comprises a block number identifying a particular block and a row number identifying a particular row in the block. Invalidation logs 124 may also include a transaction identifier which identifies the transaction. In an embodiment, invalidation logs 124 are IMCU specific. For example, a node may maintain a plurality of IMCUs, each with a corresponding SMU. The private journal may track all transactions of a node while the invalidation logs 124 store transaction data for only the transactions that affect data mirrored in the corresponding IMCU.

SMU 116 also contains header 128 which contains metadata about SMU 116. For example, header 128 may identify other SMUs for IMCU 114 with older invalidation data, such as through a chain of SMU identifiers. Header 128 may also store data indicating SCNs associated with invalidation logs. For example, when a transaction commits, SMU 118 may add an entry to invalidation logs 124 and additionally add the SCN to header 128. Thus, if a transaction at SCN 705 does not affect any data in IMCU 114, SCN 705 may not be added to header 128. Invalidation logs 124 may be updated each time a transaction affecting data in one or more rows is executed.

In an embodiment, the row-level invalidity data indicates which rows in the IMCU are invalid due to changes that were made locally. Specifically, when a transaction in a node that hosts an IMCU performs an update to rows in the database that are mirrored in the IMCU, the host node updates the row-level invalidity data for the IMCU to indicate that data, in the IMCU, from those particular rows, is no longer valid. For example, if node 102 commits a transaction that affected data in block 170, row 2, node 102 would update row-level invalidity data in invalidation bitmap 120 in SMU 116 to indicate that data in IMCU 114 corresponding to block 170, row 2 is no longer valid, but other rows in block 170 would continue to be treated as valid.

In a single node database, block-level invalidity data may be used to indicate which blocks contain rows with invalid data. Thus, in the example above, node 102 may update the block-level invalidity data for block 170 to indicate that one or more rows in block 170 contain invalid data. By identifying blocks with invalid data, node 102 is able to perform more efficient searches for invalid rows. For instance, if each block contained hundreds of rows, node 102 could skip searching through the hundred bits associated with a block if the block-level invalidity data indicates no changes to the block.

Consistent Read Queries

Node 102 generally uses data stored in IMCU 114 to respond to queries for information. One exception is when the data stored in IMCU 114 is not transactionally consistent with database 162 as of the snapshot time used by the transaction. For example, node 102 may commit a transaction X against database 162 without updating IMCU 114. Instead, SMU 116 is updated to indicate that the rows, in IMCU 114, that contain copies of items that were changed by transaction X are not transactionally consistent with database 162 as of the commit SCN of transaction X.

Each query is associated with a query SCN which indicates a transactional state of the database at the time of the query. When the query SCN matches SMU SCN 126, node 102 may identify invalid rows in IMCU 114 using invalidation bitmap 120. If the query requests a value from a row that has been marked invalid, node 102 retrieves the value from a source outside of IMCU 114. For example, a particular query may request a search through blocks 170 through 190. If row 2 of block 170 has been marked invalid in invalidation bitmap 120, node 102 may seek the value in buffer cache 118. If the values in buffer cache 118 are not transactionally consistent with database 162, node 102 may seek the values directly from database 162. As the node 102 can use data from IMCU 114 for rows that are marked as transactionally consistent with database 162, node 102 would only need to search database 162 for information from the invalid rows.

Node 102 may also receive queries with an SCN prior to that of SMU SCN 126. For example, a query may be received with an SCN of 720. Before the query is processed, a transaction with an SCN of 725 may commit to the database. When the query is processed, SMU SCN 126 may be set to 725 while the query SCN is 720. Node 102 could still use invalidation bitmap 120 to identify invalid rows in IMCU 114, but doing so would cause node 102 to identify valid rows as invalid. Thus, node 102 would reduce the efficiency with which node 102 can respond to the query because less data can be pulled from IMCU 114.

In an embodiment, if node 102 receives a query with an SCN prior to that of SMU SCN 126, node 102 may use invalidation logs 124 to generate a rollback bitmap which identifies only the rows that were not transactionally consistent with database 162 at the query SCN. Node 102 may first identify, in header 128, the transaction SCNs that caused an update to invalidation bitmap 120 between the query SCN and SMU SCN 126. Using the identified transaction SCNs, node 102 may search invalidation logs 124 for entries associated with the identified transaction SCNs. Node 102 may use the entries in invalidation logs 124 to generate an invalidation bitmap for an SCN prior or equal to the query SCN. For example, node 102 may generate an invalidation bitmap for the last SCN to include transactions that affected data in any of the rows prior to the query SCN.

In an embodiment, node 102 generates a mask bitmap from the identified entries in the invalidation logs. For example, node 102 may generate a bitmap which identifies each row which was marked as invalid after the query SCN. The mask bitmap may then be overlaid on invalidation bitmap 120 to generate the rollback bitmap.

Figure 2:
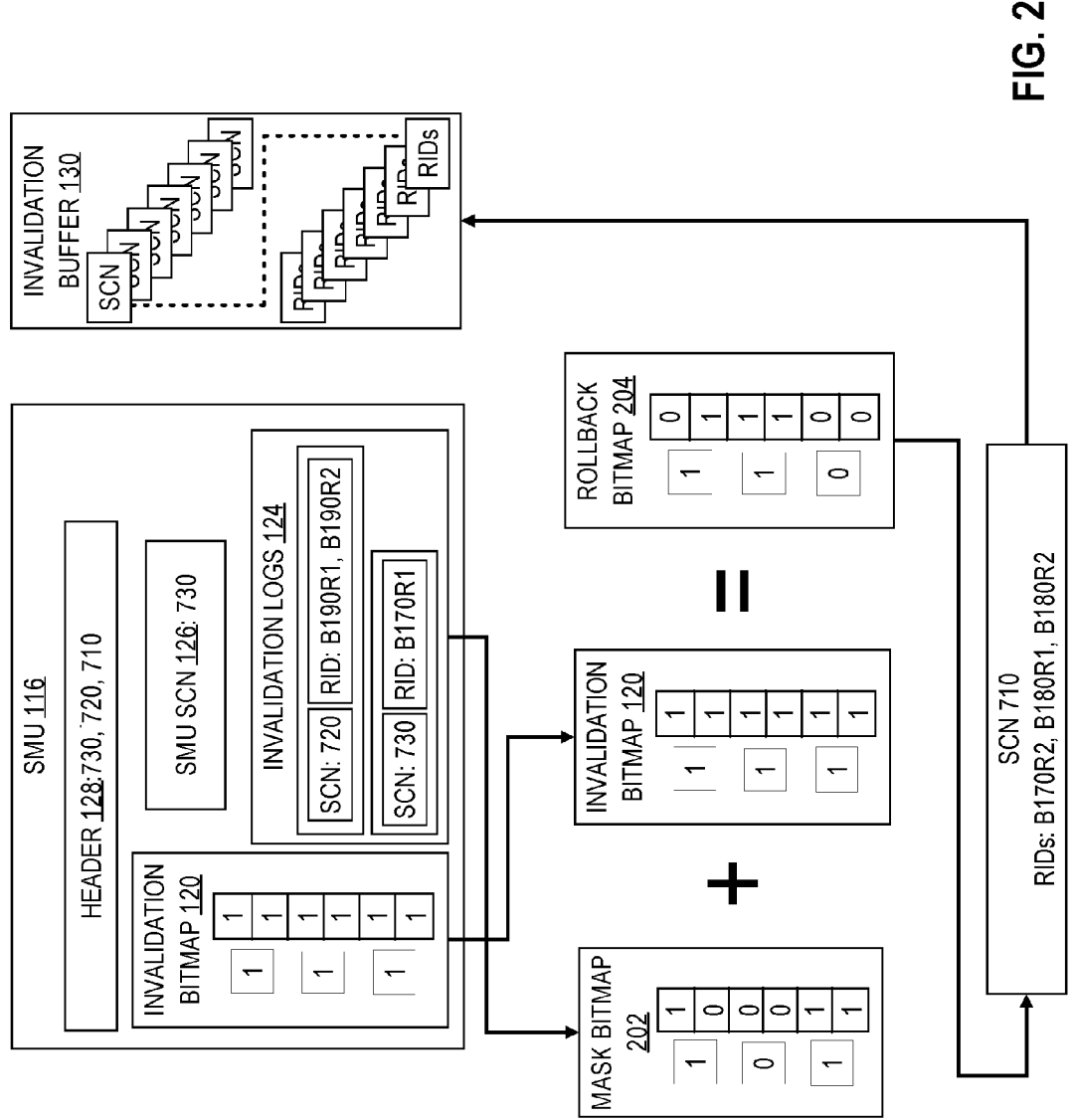
FIG. 2 depicts an example of generating a rollback bitmap from data stored in the Snapshot Metadata Unit (SMU).

FIG. 2 depicts an example of generating a rollback bitmap from data stored in the SMU. In the example of FIG. 2, invalidation bitmap 120 identifies all of the displayed rows in IMCU 114 of FIG. 1 as invalid. SMU SCN 126 in FIG. 2 is set to 730. If node 102 receives a query with a query SCN of 715, node 102 first checks header 128. In this example, header 128 includes identifiers of SCNs 730, 720, and 710. Thus, node 102 will search for entries in invalidation logs 124 with SCNs of 730 and 720. As the received query has an SCN higher than 710, node 102 does not require entries in invalidation logs 124 for SCN 710 to generate the mask bitmap.

Invalidation logs 124 include an entry at SCN 730 which identifies B170R1 and an entry at SCN 720 which identifies B190R1 and B190R2. While FIG. 2 depicts only entries associated with SCN 730 and 720, embodiments include addition entries such as an entry at 710 as well as entries between the SCNs depicted. For example, at a pre-commit stage of a transaction at SCN 725, an entry may be added to invalidation logs 124. If the transaction does not commit, SCN 725 may not be added to the header and invalidation bitmap 120 may not be updated. As SCN 725 does not appear in the header, node 102 would not use invalidation logs which identify SCN 725.

Based on invalidation logs 124, node 102 generates mask bitmap 202. Mask bitmap 202 includes identifications of each row identified in invalidation logs 124. Thus, B170R1, B190R1, and B190R2 are identified in mask bitmap 202. As no rows in B180 were identified in invalidation logs 124 at SCN 720 or SCN 730, the block-level invalidity bit for block 180 does not indicate invalidity while the block-level invalidity bits for blocks 170 and 190 do indicate invalidity. Mask bitmap 202 is overlaid on invalidation bitmap 120. Thus, each bit set to indicate invalidity in mask bitmap 202 removes a bit from invalidation bitmap 120 to produce rollback bitmap 204.

Rollback bitmap 204 identifies each row which was not transactionally consistent with database 162 as of a prior SCN. In the example of FIG. 2, as transactions corresponding to SCNs 730 and 720 were used to generate the mask bitmap, the rollback bitmap identifies rows that were not transactionally consistent with database 162 as of SCN 710, the prior SCN which included transactions which altered data in rows mirrored in IMCU 114.

In an embodiment, node 102 generates identifiers of the invalid rows from the rollback bitmap. These identifiers are then used to respond to the received query. For example, in FIG. 2, RIDs B170R2, B180R1, and B180R2 have been identified as invalid. Thus, if the query requests data from any of the three identified rows, node 102 may search for the data in buffer cache 118 or database 162.

Invalidation Buffer

In an embodiment, node 102 generates, in volatile memory, a rollback bitmap each time a new past-state consistent-read query is executed, thereby allowing SMU 116 to store only one invalidation bitmap. The trade-off is that generating the rollback bitmap and the row identifiers from the rollback bitmap is computationally expensive. Additionally, as queries are accessing the invalidation bitmap to generate the rollback bitmap, any transactions that affect the bitmap have to wait to fully commit until the query is finished because the transactions will alter the invalidation bitmap.

In an embodiment, node 102 stores cached invalid-row-identifiers in invalidation buffer 130. For example, node 102 may generate rollback bitmap 204, determine the row identifiers of the rows that rollback bitmap 204 indicates as invalid, and store those row identifiers in invalidation buffer 130 as "invalid-rowid metadata". According to one embodiment, the invalid-rowid metadata indicates (a) a particular SCN and (b) identifiers of one or more rows that have been identified as invalid as of the particular SCN. Within invalidation buffer 130, the rows identifiers may be stored as an array of row identifier values for the particular SCN.

In an embodiment, data is written sequentially into invalidation buffer 130. For example, SCNs may be written sequentially as an SCN field at the top of the invalidation buffer while corresponding RIDs are written sequentially as RID fields at the bottom of invalidation buffer 130. Thus, each entry is split up in invalidation buffer 130. As an example, using the values in FIG. 2, an invalidation buffer may include data for SCN 710 and SCN 730. At the top of the invalidation buffer, node 102 may include fields for SCN 710 and SCN 730. At the end of the invalidation buffer, node 102 store a field which comprises identifications of all rows invalid as of SCN 710, i.e. B170R2, B180R1, and B180R2. Prior to the identification of the rows invalid as of SCN 710, node 102 may store a field which comprises identifications all rows invalid as of SCN 730, i.e. B170R1, 170R2, B180R1, B180R2, B190R1, and B190R2.

The invalidation buffer 130 may be configured to store a limited amount of data, thereby reducing the amount of data stored in node 102. When invalidation buffer 130 runs out of memory, node 102 may start removing entries from the ends of invalidation buffer 130. Thus, node 102 removes the oldest SCN first along with corresponding RIDs in order to keep invalidation buffer 130 current. The cost of removing the older SCNs and corresponding RIDs is relatively low, given that queries are more likely to have an SCN closer to the SMU SCN.

Responding to Queries Using Invalidation Buffer

By using an invalidation buffer which stores invalid-rowid metadata, node 102 is able to more efficiently respond to queries with an SCN prior to SMU SCN 126. For example, assume a query is received with an SCN of 715 while SMU SCN 126 is set to 730. Node 102 may first identify, in header 128, the SCNs associated with transactions as 730, 720, and 710. Instead of generating a mask bitmap, node 102 may search invalidation buffer 130 for an SCN prior or equal to SCN 715, such as SCN 710.

Once node 102 identifies SCN 110 in invalidation buffer 130, node 102 may identify the corresponding row IDs in invalidation buffer 130. For example, if six SCNs precede SCN 710, node 102 may skip the first six arrays of RIDs in order to identify the RIDs that correspond to SCN 710. Thus, without generating a new list of invalid RIDs for each search, node 102 is able to use stored invalid-rowid metadata to identify which rows are invalid as of a prior SCN.

In an embodiment, invalidation buffer 130 does not include entries for each transaction. Thus, node 102 may receive queries with an SCN prior to SMU SCN 126, but after a transaction SCN which is not identified in invalidation buffer 130. For example, in the example of FIG. 2, invalidation buffer 130 may store invalid-rowid metadata for SCN 710 and SCN 730. If node 102 receives a query with SCN 725, neither the invalid-rowid metadata for SCN 710 nor the invalid-rowid metadata for SCN 730 would suffice to respond to the query because transactions occurred at SCN 720.

Node 102 may supplement data in invalidation buffer 130 with data retrieved from SMU 116 when invalid-rowid metadata in invalidation buffer 130 does not suffice on its own. For example, in response to receiving a query with SCN 725, node 102 may determine whether the query SCN is lower than the SMU SCN. The query SCN of 725 is lower than SMU SCN 126 of 730, so node 102 checks invalidation buffer to determine if an entry includes an SCN prior to SCN 725. Node 102 determines that invalidation buffer 130 contains SCN 730 and SCN 710. Node 102 may retrieve the RIDs associated with SCN 710 from invalidation buffer 130 to be possibly supplemented with data from SMU 116.

In SMU 116, node 102 checks header 128 to determine if any transactions committed between the SCN identified in invalidation buffer 130 and the query SCN. Header 128 includes SCNs 710, 720, and 730. As SCN 720 is between the identified SCN of 710 and the query SCN of 725, node 102 determines that one or more transactions have committed between the identified SCN and the query SCN. Node 102 may then use invalidation logs 124 to identify rows that were affected by transactions that occurred between the identified SCN from invalidation buffer 130 and the query SCN. For example, node 102 may search for a transaction with SCN of 720 which was identified in header 128. The entry which identifies SCN 720 additionally identifies RIDs B190R1 and B190R2 as having been affected by the transaction. Thus, in addition to the RIDs retrieved from invalidation buffer 130, node 102 may identify RIDs B190R1 and B190R2 as invalid.

Updating Invalidation Buffer

In one embodiment, node 102 generates invalid-rowid metadata for invalidation buffer 130 without generating any invalidation bitmap 120. In such an embodiment, node 102 generates a first entry for invalidation buffer 130 using invalidation logs 124 and data in header 128. For example, node 102 may identify a first SCN to add to invalidation buffer 130. Node 102 may identify, in header 128, each transaction SCN that is between initialization of IMCU 114 and the first SCN. Node 102 may then extract RIDs from entries in invalidation logs 124 associated with the identified transaction SCNs. The first entry for invalidation buffer 130 may include the first SCN and the extracted RIDs.

Node 102 may generate a second entry for invalidation buffer 130 using the techniques described herein. For example, node 102 may identify a second SCN to add to invalidation buffer 130. Using the header and invalidation logs in IMCU 114, node 102 may identify RIDs associated with transactions that committed between the first SCN and the second SCN. Node 102 may then generate the second entry comprising the second SCN and an identification of the RIDs from the first entry and the RIDs from the transactions that committed between the first SCN and the second SCN.

In an embodiment, node 102 determines whether to update invalidation buffer 130 based on a number of changes made to rows mirrored in IMCU 114 and/or a number of transactions that committed between a first SCN and a second SCN. For example, node 102 may store a change threshold value which identifies a threshold number of rows that must include changes before node 102 updates invalidation buffer 130. Node 102 may review invalidation logs 124 to determine a number of rows that were affected by transactions between a prior SCN in invalidation buffer 130 and a particular SCN. If the number of rows affected by transactions is greater than the change threshold value, node 102 may update the invalidation buffer.

In an embodiment, node 102 makes a determination whether to update invalidation buffer 130 periodically. For example, node 102 may be programmed or configured to determine whether to update invalidation buffer 130 every tenth increment of SMU SCN. Additionally and/or alternatively, node 102 may be programmed or configured to determine whether to update buffer 130 in response to receiving a query.

Figure 3:
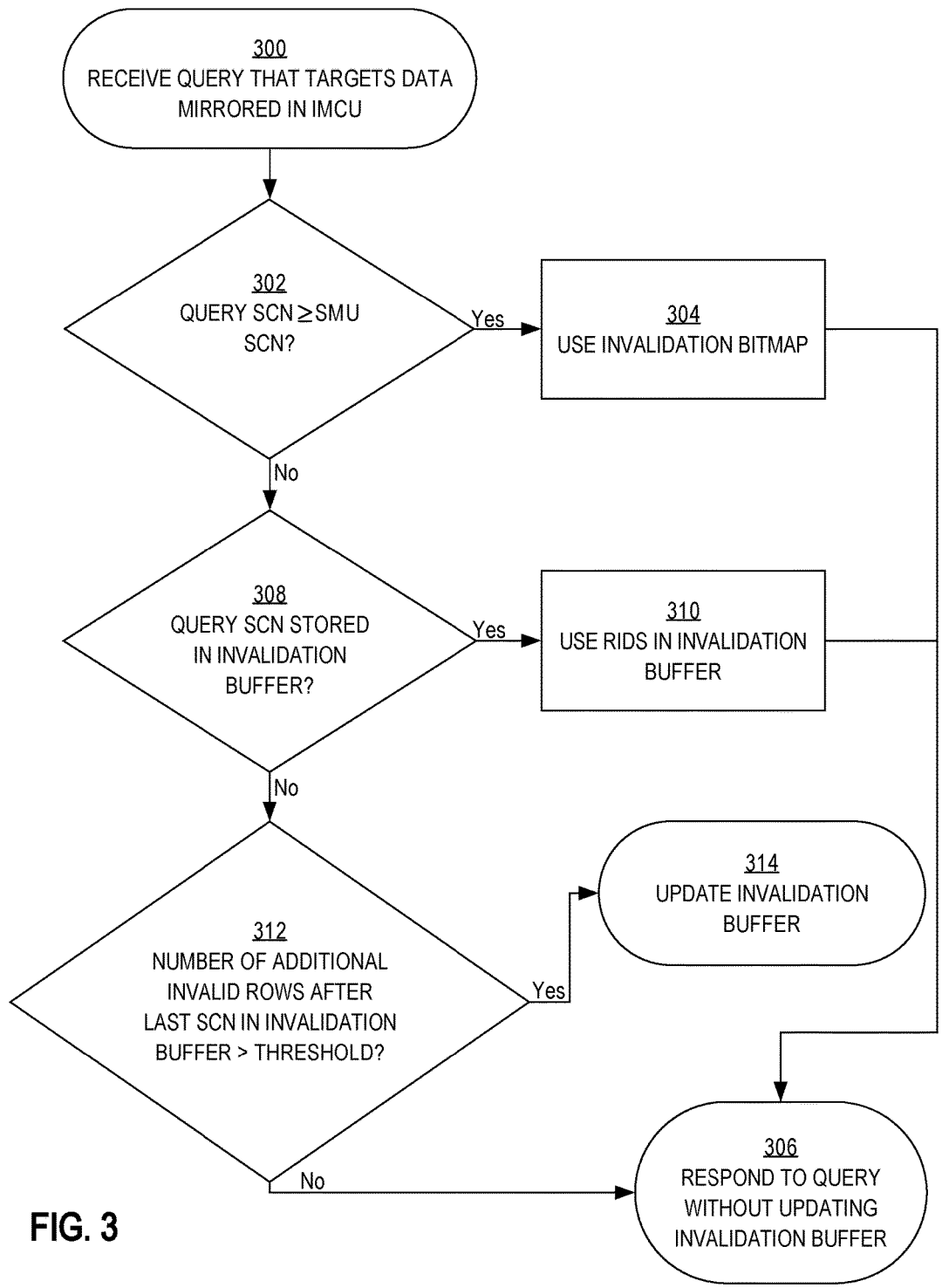
FIG. 3 is a flowchart that illustrates a process by which a host node determines whether to update an invalidation buffer, according to one embodiment.

FIG. 3 is a flowchart that illustrates a process by which a host node determines whether to update an invalidation buffer, according to one embodiment.

At step 300, node 102 receives a query that targets data mirrored in IMCU 114. The query includes a query SCN which identifies a transactional state of the database at the time of the query.

At step 302, node 102 determines whether the query SCN is greater than or equal to the SMU SCN. If the query SCN is greater than or equal to the SMU SCN, at step 304, node 102 identifies invalid rows in IMCU 114 using the invalidation bitmap. As the query did not trigger use of the invalidation logs, at step 306, node 102 responds to the query without updating the invalidation buffer. If the query SCN is less than the SMU SCN, node 102 may first determine whether any transactions have committed between the query SCN and the SMU SCN. For example, node 102 may identify transaction SCNs in header 118. If none of the transaction SCNs are between the query SCN and the SMU SCN, node 102 may treat the query SCN as being equal to the SMU SCN. If header 118 includes one or more transaction SCNs between the query SCN and SMU SCN, node 102 may determine that the query SCN is less than the SMU SCN.

At step 308, in response to determining that the query SCN is less than the SMU SCN, node 102 determines whether the last transaction SCN is stored in the invalidation buffer. For example, node 102 may identify, in header 118, the highest transaction SCN that is less than or equal to the query SCN to be used as the last transaction SCN. The last transaction SCN identifies a transactional state as of the SCN of the last transaction which affected rows mirrored in IMCU 114 prior to the query SCN. Node 102 may then search the invalidation buffer for the last transaction SCN.

If the last transaction SCN is in the invalidation buffer, node 102 may use the RIDs in the invalidation buffer to identify invalid rows in IMCU 114. As no additional rows were identified as invalid for the query SCN, node 102 evaluates the query without generating new change entries for the invalid-rowid metadata. If the last transaction SCN is not stored in the invalidation buffer, then the invalid-rowid metadata in the invalidation buffer is insufficient on its own to determine which rows in the IMCU were not transactionally consistent with the corresponding rows in the database. In order to identify each invalid row without including one or more valid rows, node 102 may use the RIDs associated with the last SCN in the invalidation buffer prior to the query SCN supplemented with invalidation logs identifying changes to rows between the last SCN in the invalidation buffer and the last transaction SCN.

At step 312, node 102 determines whether a number of additional invalid rows after the last SCN in the invalidation buffer is greater than a change threshold value. In the embodiments described herein, node 102 generates invalidation data using invalid-rowid metadata from a prior SCN in invalidation buffer 130, if available, and invalidation logs 124. Node 102 may be programmed or configured to identify the number of RIDs extracted from invalidation logs 124 to generate the invalidation data. If the number of extracted RIDs is greater than the threshold value, then, at step 314, node 102 updates invalidation buffer 130 with the invalid-rowid metadata and the query SCN.

In alternative embodiments, node 102 may determine whether a number of transactions is greater than a transaction threshold. For example, node 102 may be programmed or configured to compute the number of transaction SCNs in header 118 that are between the query SCN and the last SCN in invalidation buffer 130 prior to the query SCN. If the number of transaction SCNs exceeds the transaction threshold value, node 102 may update invalidation buffer with the query SCN and associated RIDs. If the number of transaction SCNs does not exceed the threshold value, node 102 may complete the query without updating invalidation buffer 130.

Multi-Node Systems

Embodiments of the present disclosure may also be applied to multi-node systems. In single node systems, invalidation logs are available at the row-level because a particular node is aware of transactions committed by the particular node. In a multi-node system, for a particular node to make changes to particular data in database 162, the particular node requests a write lock to one or more blocks containing the particular data. Each other node releases its shared lock on the one or more blocks so that the particular node can obtain the write lock. Upon releasing the shared lock, the other nodes update invalidity data to indicate that the one or more blocks are invalid.

In a multi-node system, a node may store, in the SMU, an invalidation bitmap which includes block-level invalidity information and row-level invalidity information. The block-level invalidity information identifies blocks which have been marked invalid in response to the node releasing a shared lock on the block. The row-level invalidity information identifies rows which have been marked invalid in response to transactions that the node itself committed to the database.

Node 102, in a multi-node system, may store block-level invalidation logs which identify SCNs at which node 102 released a shared lock on a particular block. Node 102 may generate invalid-rowid metadata using the invalidation logs in a similar method as described herein, but with identifiers of blocks that have been marked invalid at particular SCNs along with rows that have been marked invalid. Thus, a particular entry in invalidation buffer 130 may include an SCN and identifiers of block IDs and RIDs. Additionally and/or alternatively, node 102 may convert the block IDs into RIDs for each row in the block. For example, if block 170 was marked invalid as of SCN 730, node 102 may add an entry to invalidation buffer 130 which includes SCN 730 and RIDs B170R1 and B170R2.

In order to determine whether to update invalidation buffer 130, node 102 may determine whether a number of invalid rows added between a last SCN in invalidation buffer 130 and a particular SCN is greater than or equal to a change threshold value. In order to make the determination, node 102 may identify a number of rows in a particular block that have been marked as invalid between the last SCN and the particular SCN. Node 102 may subtract from the number of rows in the particular block a value corresponding to a number of rows in the particular block that had been marked as invalid at the last SCN. Thus, if at SCN 720 RID B170R1 had been marked as invalid and at SCN 730 B170 was marked as invalid, the number of rows added between SCN 720 and SCN 730 would be 2, the number of rows in block 170, minus 1, the number of rows in block 170 that were invalid as of SCN 720.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
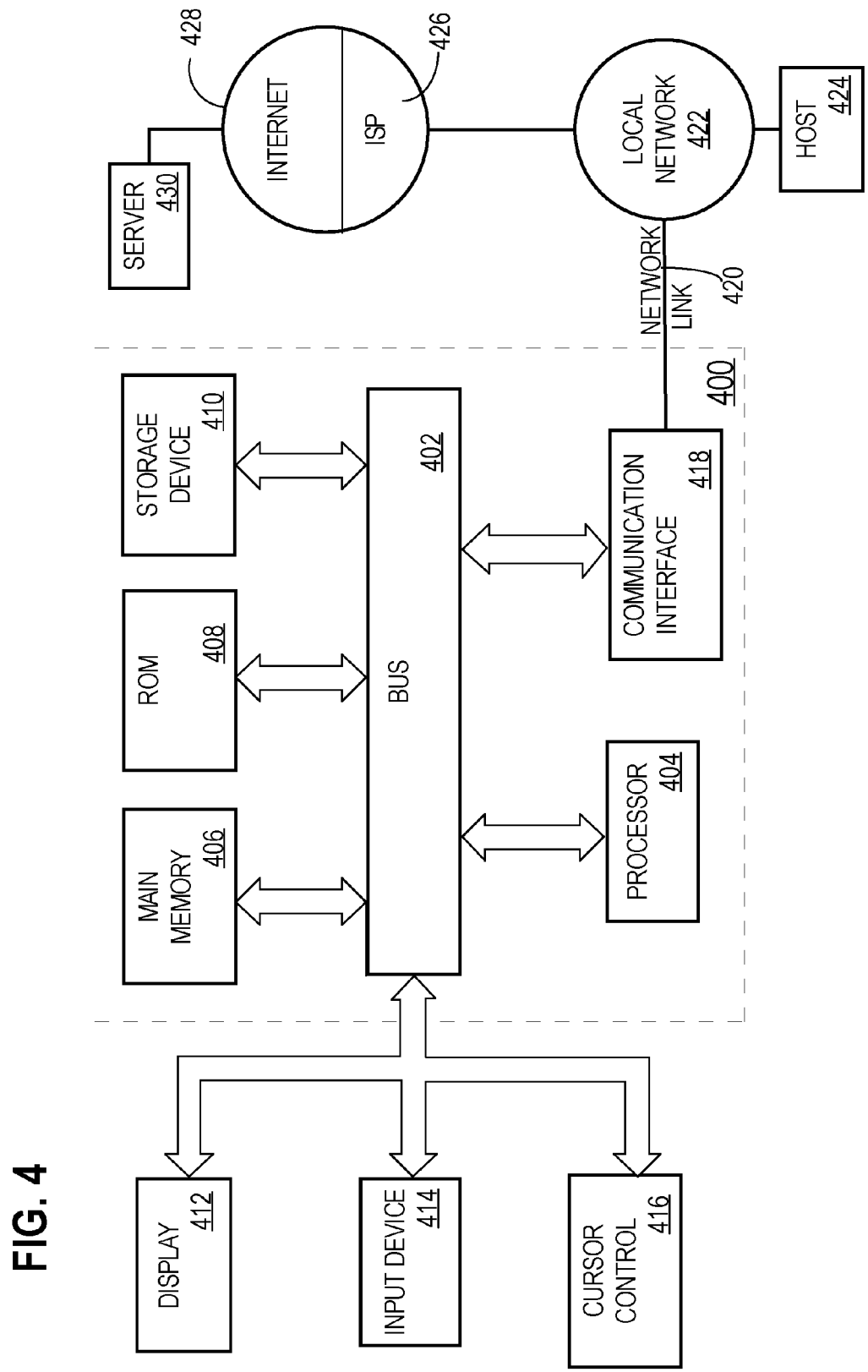
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   maintaining, on persistent storage, a database that is accessible to a database server;
   wherein said database includes a set of persistent format data (PF data), stored on said persistent storage, in a persistent format;
   converting said set of PF data to a mirror format to produce a set of mirror format data (MF data);
   storing said set of MF data within byte-addressable memory;
   receiving a first past-state consistent-read query associated with a first query system change number (SCN);
   in response to receiving the first past-state consistent-read query:
   determining a first set of row identifiers;
   wherein the first set of row identifiers consists of the row identifier of each row in the MF data that is not transactionally consistent with a corresponding row in said PF data as of the first query SCN;
   processing the first past-state consistent-read query using data, from the MF data, of rows with row identifiers that are not in the first set of row identifiers;
   after processing the first past-state consistent-read query, maintaining, in a buffer, the first set of row identifiers in association with the first query SCN;
   receiving a second past-state consistent-read query associated with a second query SCN that is equal to or greater than the first query SCN;
   in response to receiving the second past-state consistent-read query:
   based on the first query SCN, identifying the first set of row identifiers in the buffer;
   reading the first set of row identifiers from the buffer;
   processing the second past-state consistent-read query using data, from the MF data, of rows with row identifiers that are not in the first set of row identifiers.

2. The method of claim 1, wherein, using said MF data, processing the second past-state consistent-read query comprises:
   based on the first set of row identifiers in the buffer, determining that a row in said MF data is not transactionally consistent with the first query SCN, and
   in response to determining that a row in said MF data is not transactionally consistent with said first query SCN, retrieving a value for said row that is transactional consistent with said first query SCN.

3. The method of claim 1, further comprising:
   storing an invalidation bitmap which identifies, as of a bitmap SCN, each row that is not transactionally consistent with a corresponding row in said PF data;
   storing transaction entries, each of which identifying a particular transaction, a transaction SCN, and one or more rows affected by the particular transaction;
   determining the first set of row identifiers by at least:
   using the transaction entries, generating a rollback invalidation bitmap which identifies, as of the first query SCN, each row that is not transactionally consistent with a corresponding row in said PF data;
   converting the rollback invalidation bitmap into the first set of row identifiers;

storing the first set of row identifiers and the first query SCN in the buffer.

4. The method of claim 3, further comprising:
identifying, one or more transaction entries corresponding to one or more SCNs after the first query SCN and up to and including a second SCN;
identifying, for each of the one or more transaction entries, one or more rows affected by one or more transactions;
determining, from the identified one or more rows and the first set of row identifiers, a second set of row identifiers;
wherein the second set of row identifiers consists of the row identifier of each row in the MF data that is not transactionally consistent with a corresponding row in said PF data as of the second SCN.

5. The method of claim 1, further comprising:
storing transaction entries, each of which identifying a transaction SCN and one or more rows affected by a transaction corresponding to the transaction SCN;
receiving a third past-state consistent-read query associated with a third query SCN;
in response to receiving the third past-state consistent-read query:
identifying a last transaction SCN associated with a last transaction that caused one or more rows to not be transactionally consistent with one or more corresponding rows in said PF data prior to the third query SCN;
identifying, in the buffer, a particular SCN associated with a change entry prior to the third query SCN;
determining that the transaction SCN is lower than the particular SCN;
identifying, one or more rows affected by transactions between the particular SCN and the third query SCN;
in response to identifying the one or more rows affected by transactions between the particular SCN and the third query SCN, retrieving a value for said one or more rows that is transactionally consistent with said third query SCN.

6. The method of claim 5, further comprising:
storing a change threshold value;
determining that a number of the one or more rows affected by transactions between the particular SCN and the third query SCN exceeds the change threshold value and, in response, adding a second set of row identifiers to the buffer wherein the second set of row identifiers comprises at least row identifiers of the one or more rows affected by transactions between the particular SCN and the third query SCN.

7. The method of claim 1, further comprising:
identifying a new set of row identifiers to maintain in the buffer;
determining that the buffer does not contain enough space to add the new set of row identifiers and, in response, erasing an oldest set of row identifiers.

8. One or more non-transitory computer-readable media storing instructions which, when executed by one or more processors, cause:
maintaining, on persistent storage, a database that is accessible to a database server;
wherein said database includes a set of persistent format data (PF data), stored on said persistent storage, in a persistent format;
converting said set of PF data to a mirror format to produce a set of mirror format data (MF data);
storing said set of MF data within byte-addressable memory;
receiving a first past-state consistent-read query associated with a first query system change number (SCN);
in response to receiving the first past-state consistent-read query:
determining a first set of row identifiers;
wherein the first set of row identifiers consists of the row identifier of each row in the MF data that is not transactionally consistent with a corresponding row in said PF data as of the first query SCN;
processing the first past-state consistent-read query using data, from the MF data, of rows with row identifiers that are not in the first set of row identifiers;
after processing the first past-state consistent-read query, maintaining, in a buffer, the first set of row identifiers in association with the first query SCN;
receiving a second past-state consistent-read query associated with a second query SCN that is equal to or greater than the first query SCN;
in response to receiving the second past-state consistent-read query:
based on the first query SCN, identifying the first set of row identifiers in the buffer;
reading the first set of row identifiers from the buffer;
processing the second past-state consistent-read query using data, from the MF data, of rows with row identifiers that are not in the first set of row identifiers.

9. The one or more non-transitory computer-readable media of claim 8 wherein, using said MF data, processing the second past-state consistent-read query comprises:
based on the first set of row identifiers in the buffer, determining that a row in said MF data is not transactionally consistent with the first query SCN, and
in response to determining that a row in said MF data is not transactionally consistent with said first query SCN, retrieving a value for said row that is transactional consistent with said first query SCN.

10. The one or more non-transitory computer-readable media of claim 8 wherein the instructions, when executed by the one or more processors, further cause:
storing an invalidation bitmap which identifies, as of a bitmap SCN, each row that is not transactionally consistent with a corresponding row in said PF data;
storing transaction entries, each of which identifying a particular transaction, a transaction SCN, and one or more rows affected by the particular transaction;
determining the first set of row identifiers by at least:
using the transaction entries, generating a rollback invalidation bitmap which identifies, as of the first query SCN, each row that is not transactionally consistent with a corresponding row in said PF data;
converting the rollback invalidation bitmap into the first set of row identifiers;
storing the first set of row identifiers and the first query SCN in the buffer.

11. The one or more non-transitory computer-readable media of claim 10 wherein the instructions, when executed by the one or more processors, further cause:
identifying, one or more transaction entries corresponding to one or more SCNs after the first query SCN and up to and including a second SCN;
identifying, for each of the one or more transaction entries, one or more rows affected by one or more transactions;

determining, from the identified one or more rows and the first set of row identifiers, a second set of row identifiers;

wherein the second set of row identifiers consists of the row identifier of each row in the MF data that is not transactionally consistent with a corresponding row in said PF data as of the second SCN.

12. The one or more non-transitory computer-readable media of claim 8 wherein the instructions, when executed by the one or more processors, further cause:

storing transaction entries, each of which identifying a transaction SCN and one or more rows affected by a transaction corresponding to the transaction SCN;

receiving a third past-state consistent-read query associated with a third query SCN;

in response to receiving the third past-state consistent-read query:

identifying a last transaction SCN associated with a last transaction that caused one or more rows to not be transactionally consistent with one or more corresponding rows in said PF data prior to the third query SCN;

identifying, in the buffer, a particular SCN associated with a change entry prior to the third query SCN;

determining that the transaction SCN is lower than the particular SCN;

identifying, one or more rows affected by transactions between the particular SCN and the third query SCN;

in response to identifying the one or more rows affected by transactions between the particular SCN and the third query SCN, retrieving a value for said one or more rows that is transactionally consistent with said third query SCN.

13. The one or more non-transitory computer-readable media of claim 12 wherein the instructions, when executed by the one or more processors, further cause:

storing a change threshold value;

determining that a number of the one or more rows affected by transactions between the particular SCN and the third query SCN exceeds the change threshold value and, in response, adding a second set of row identifiers to the buffer wherein the second set of row identifiers comprises at least row identifiers of the one or more rows affected by transactions between the particular SCN and the third query SCN.

14. The one or more non-transitory computer-readable media of claim 8 wherein the instructions, when executed by the one or more processors, further cause:

identifying a new set of row identifiers to maintain in the buffer;

determining that the buffer does not contain enough space to add the new set of row identifiers and, in response, erasing an oldest set of row identifiers.

* * * * *

UNITED STATES PATENT AND TRADEMARK OFFICE
CERTIFICATE OF CORRECTION

PATENT NO. : 10,437,688 B2
APPLICATION NO. : 15/273273
DATED : October 8, 2019
INVENTOR(S) : He et al.

Page 1 of 1

It is certified that error appears in the above-identified patent and that said Letters Patent is hereby corrected as shown below:

In the Specification

In Column 4, Line 41, delete ""table, "" and insert -- "table," --, therefor.

Signed and Sealed this
Thirteenth Day of October, 2020

Andrei Iancu
*Director of the United States Patent and Trademark Office*